(12) United States Patent
Ho et al.

(10) Patent No.: US 11,774,668 B1
(45) Date of Patent: Oct. 3, 2023

(54) LIGHT-EMITTING MODULE

(71) Applicant: Chicony Power Technology Co., Ltd., New Taipei (TW)

(72) Inventors: Hsuan-Wei Ho, New Taipei (TW); Ting-Wei Chang, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 18/192,668

(22) Filed: Mar. 30, 2023

(30) Foreign Application Priority Data

Jan. 7, 2023 (TW) ................. 112100765

(51) Int. Cl.
*F21V 8/00* (2006.01)

(52) U.S. Cl.
CPC ......... *G02B 6/0073* (2013.01); *G02B 6/0055* (2013.01); *G02B 6/0058* (2013.01); *G02B 6/0083* (2013.01)

(58) Field of Classification Search
CPC .. G02B 6/0073; G02B 6/0055; G02B 6/0058; G02B 6/0083
See application file for complete search history.

(56) References Cited

U.S. PATENT DOCUMENTS

| | | | |
|---|---|---|---|
| 10,557,279 B1* | 2/2020 | Webb | F21L 4/02 |
| 11,630,259 B1* | 4/2023 | Ho | G02B 6/0031 362/606 |
| 11,639,610 B2* | 5/2023 | Chambers | E04H 12/182 362/486 |
| 11,675,119 B1* | 6/2023 | Ho | G02B 6/004 362/606 |
| 2010/0232148 A1* | 9/2010 | Sharpley | F21L 4/08 362/183 |
| 2013/0176215 A1* | 7/2013 | Huang | G02B 6/0038 345/157 |
| 2016/0238777 A1* | 8/2016 | Chen | G02B 6/0016 |

FOREIGN PATENT DOCUMENTS

| | | |
|---|---|---|
| CN | 207112451 U | 3/2018 |
| CN | 114280843 A | 4/2022 |
| TW | 200535506 A | 11/2005 |
| TW | M362999 U | 8/2009 |
| TW | 201211644 A | 3/2012 |

(Continued)

*Primary Examiner* — Mary Ellen Bowman
(74) *Attorney, Agent, or Firm* — CKC & Partners Co., LLC

(57) ABSTRACT

A light-emitting module includes a light guide plate, a light-emitting element, a first reflection layer and a second reflection layer. The light guide plate has a light incident surface, a light exit surface, a first surface, and a second surface. The light incident surface has three edges connected sequentially. The first surface, the light exit surface, and the second surface are connected to the edges respectively. The first surface and the second surface are respectively located on opposite sides of the light guide plate. The light exit surface extends away from the light incident surface and is elongated. The light-emitting element is configured to emit light toward the light incident surface. The first reflection layer is disposed corresponding to the first surface to cover the first surface. The second reflection layer is disposed corresponding to the second surface to cover the second surface.

16 Claims, 6 Drawing Sheets

(56) References Cited

FOREIGN PATENT DOCUMENTS

| TW | I432801 B | 4/2014 |
|---|---|---|
| TW | M486865 U | 9/2014 |
| TW | I598772 B | 9/2017 |
| TW | I626483 B | 6/2018 |
| TW | I709259 B | 11/2020 |

* cited by examiner

LIGHT-EMITTING MODULE

CROSS-REFERENCE TO RELATED APPLICATION

This application claims priority to Taiwan Application Serial Number 112100765, filed Jan. 7, 2023, which is herein incorporated by reference.

BACKGROUND

Technical Field

The present disclosure relates to a light-emitting module.

Description of Related Art

Backlight modules (BLMs) are widely used in various 3C products. Nowadays, many e-sports products focus on lighting effects, and many BLMs are used to make luminous visual effects on the exterior logos or light bars. Generally, a BLM is basically a combination product of a light guide film module and an LED light bar, in which the light guide film module is composed of a reflector, a light guide plate, and a diffuser.

However, the size of a traditional BLM design is limited by the width of the LED. The light-emitting area smaller than the width of the LED can only rely on the light-shielding cover plate to define a narrow-width light-transmitting line, but the size of the entire mechanism of the BLM is still very large, which limits the application of the BLM. For example, a narrow bezel or side area of a laptop cannot be achieved due to BLM width/thickness constraints. Even if the optical fiber design is adopted, the light output effect of the optical fiber is not good and cannot be controlled. It only relies on the light transmission characteristics of the optical fiber itself, and the light leaked from the optical fiber is used as the output light. In this way, in addition to poor uniformity, the overall light intensity is not bright enough, and it is impossible to adjust and optimize the intensity and uniformity of the optical fiber.

Accordingly, how to provide a light-emitting module to solve the aforementioned problems becomes an important issue to be solved by those in the industry.

SUMMARY

An aspect of the disclosure is to provide a light-emitting module that can efficiently solve the aforementioned problems.

According to an embodiment of the disclosure, a light-emitting module includes a light guide plate, a light-emitting element, a first reflection layer, and a second reflection layer. The light guide plate has a light incident surface, a light exit surface, a first surface, and a second surface. The light incident surface has three edges connected sequentially. The first surface, the light exit surface, and the second surface are connected to the edges respectively. The first surface and the second surface are respectively located on opposite sides of the light guide plate. The light exit surface extends away from the light incident surface and is elongated. The light-emitting element is configured to emit light toward the light incident surface. The first reflection layer is disposed corresponding to the first surface to cover the first surface and configured to reflect light exiting the light guide plate from the first surface back into the light guide plate. The second reflection layer is disposed corresponding to the second surface to cover the second surface and configured to reflect light exiting the light guide plate from the second surface back into the light guide plate.

In an embodiment of the disclosure, the light-emitting module further includes a plurality of optical disturbance structures. The optical disturbance structures are disposed on the first surface. A density of the optical disturbance structures gradually increases in a direction away from the light incident surface and in a direction toward the light exit surface.

In an embodiment of the disclosure, the light guide plate has a second light incident surface. The second light incident surface and the light incident surface are respectively located on opposite two sides of the light guide plate. The light-emitting module further includes a second light-emitting element. The second light-emitting element is configured to emit light toward the second light incident surface.

In an embodiment of the disclosure, the light-emitting module further includes a plurality of second optical disturbance structures. The second optical disturbance structures are disposed on one of the first surface and the second surface. A density of the second optical disturbance structures gradually increases in a direction away from the second light incident surface and in the direction toward the light exit surface.

In an embodiment of the disclosure, the first surface includes a first zone and a second zone. The first zone is connected to the light incident surface. The optical disturbance structures are disposed in the first zone. The second zone is connected between the first zone and the second light incident surface. The second optical disturbance structures are disposed in the second zone.

In an embodiment of the disclosure, the light guide plate further has a back surface. The light exit surface and the back surface are respectively located on opposite two sides of the light guide plate. The first surface includes a first zone and a second zone. The first zone is connected to the light exit surface. The optical disturbance structures are disposed in the first zone. The second zone is connected between the first zone and the back surface. The second optical disturbance structures are disposed in the second zone.

In an embodiment of the disclosure, the second optical disturbance structures are disposed on the second surface.

In an embodiment of the disclosure, a height of the second light-emitting element relative to the first surface is greater than a height of the light-emitting element relative to the first surface.

In an embodiment of the disclosure, the light-emitting module further includes a light-shielding structure. The light-shielding structure covers the second light incident surface. A height of the second light-emitting element relative to the first surface is greater than a height of the light-shielding structure relative to the first surface.

In an embodiment of the disclosure, the light-emitting module further includes a light-shielding structure. A projection of the light-shielding structure in a direction perpendicular to the light exit surface covers a part of the light exit surface and a gap between the light-emitting element and the light incident surface. The part of the light exit surface is simultaneously connected to the light incident surface, the first surface, and the second surface.

In an embodiment of the disclosure, the light-shielding structure is a portion extending from the second reflection layer.

In an embodiment of the disclosure, the second surface has a light exit zone. The light exit zone is a zone on the second surface not being covered by the second reflection layer.

According to an embodiment of the disclosure, a light-emitting module includes a circuit board, a light guide plate, an optical disturbance portion, a first reflection layer, and a second reflection layer. A first light-emitting element and a second light-emitting element are disposed on the circuit board. The light guide plate is disposed over the circuit board and located between the first light-emitting element and the second light-emitting element. The light guide plate has a first end surface, a second end surface, a top surface, and a bottom surface. The first end surface is adjacent to the first light-emitting element. The second end surface is adjacent to the second light-emitting element. The optical disturbance portion is disposed on one of the top surface and the bottom surface. The first reflection layer is disposed on the bottom surface of the light guide plate and configured to reflect light exiting the light guide plate back into the light guide plate. The second reflection layer is disposed on the top surface of the light guide plate and configured to reflect light exiting the light guide plate back into the light guide plate. Light emitted by the first light-emitting element enters the light guide plate through the first end surface. Light emitted by the second light-emitting element enters the light guide plate through the second end surface. A first side surface and a second side surface are respectively located on opposite two sides of the light guide plate. The top surface and the bottom surface are respectively located on opposite two sides of the light guide plate.

In an embodiment of the disclosure, the one of the top surface and the bottom surface has a first light guide zone, a second light guide zone, a third light guide zone, and a fourth light guide zone. The first light guide zone and the second light guide zone are connected to the first side surface. The third light guide zone and the fourth light guide zone are connected to the second side surface. A total area of the optical disturbance portion in the first light guide zone and a total area of the optical disturbance portion in the second light guide zone are substantially equal. A total area of the optical disturbance portion in the third light guide zone and a total area of the optical disturbance portion in the fourth light guide zone are substantially equal. The total area of the optical disturbance portion in the first light guide zone is greater than the total area of the optical disturbance portion in the third light guide zone.

In an embodiment of the disclosure, the optical disturbance portion includes a plurality of optical disturbance structures. The one of the top surface and the bottom surface has a first light guide zone, a second light guide zone, a third light guide zone, and a fourth light guide zone. The first light guide zone and the second light guide zone are connected to the first side surface. The third light guide zone and the fourth light guide zone are connected to the second side surface. A number of the optical disturbance structures in the first light guide zone and a number of the optical disturbance structures in the second light guide zone are substantially equal. A number of the optical disturbance structures in the third light guide zone and a number of the optical disturbance structures in the fourth light guide zone are substantially equal. The number of the optical disturbance structures in the first light guide zone is greater than the number of the optical disturbance structures in the third light guide zone.

In an embodiment of the disclosure, when squarely viewing the one of the top surface and the bottom surface, areas of any two of the optical disturbance structures are substantially equal.

Accordingly, in the light-emitting module of the present disclosure, the light exit surface of the light guide plate extends away from the light incident surface and is elongated, and the light exit surface is connected between the first surface and the second surface respectively located on opposite sides of the light guide plate. The first reflection layer disposed on the first surface is configured to reflect light exiting the light guide plate from the first surface back into the light guide plate. The second reflection layer disposed on the second surface is configured to reflect light exiting the light guide plate from the second surface back into the light guide plate. It can be seen that the first surface or the second surface of the light guide plate of the present disclosure actually corresponds to the light exit surface of a traditional light guide plate, and the light exit surface of the light guide plate of the present disclosure actually corresponds to a side surface of the traditional light guide plate. Different from the front light emitting method of the traditional light guide plate, the size of the light exit surface of the light guide plate of the present disclosure is the thickness of the light guide plate, so the light-emitting module of the present disclosure can provide the visual effect of a slender light exit surface.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
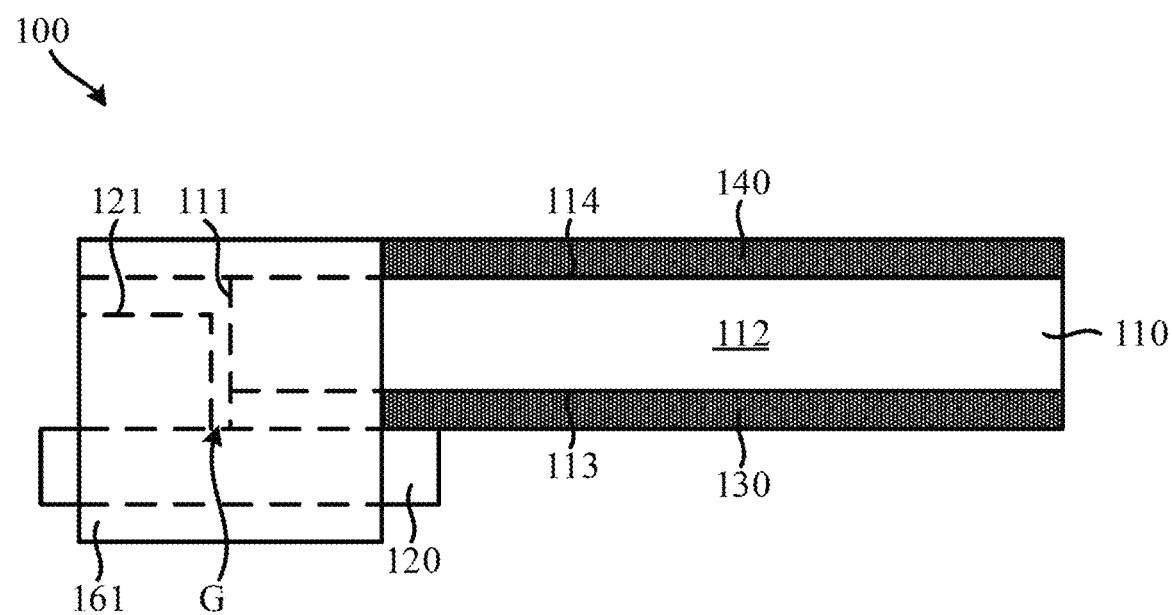
FIG. 1A is a side view of a light-emitting module according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1B:
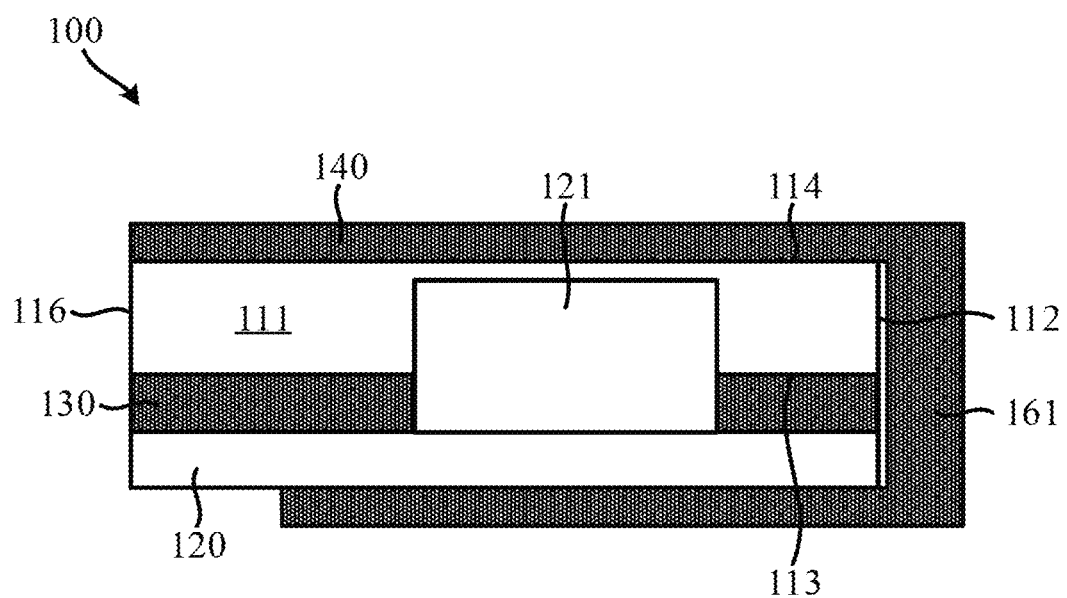
FIG. 1B is another side view of the light-emitting module in FIG. 1A.

Reference is made to FIGS. 1A and 1B. FIG. 1A is a side view of a light-emitting module 100 according to an embodiment of the disclosure. FIG. 1B is another side view of the light-emitting module 100 in FIG. 1A. Specifically, the angle of view in FIG. 1B is from left to right when viewing the light-emitting module 100 in FIG. 1A. As shown in FIGS. 1A and 1B, in the present embodiment, the light-emitting module 100 includes a light guide plate 110, a circuit board 120, a first reflection layer 130, and a second reflection layer 140. The light guide plate 110 is disposed over the circuit board 120 and has a light incident surface 111, a light exit surface 112, a first surface 113, and a second surface 114. The light incident surface 111 has three edges connected sequentially (e.g., the upper edge, the right edge, and the lower edge of the light guide plate 110 in FIG. 1B). The first surface 113, the light exit surface 112, and the second surface 114 are connected to the edges respectively. The first surface 113 and the second surface 114 are respectively located on opposite two sides of the light guide plate 110. In addition, the light guide plate 110 further has a back surface 116. The light exit surface 112 and the back surface 116 are respectively located on opposite two sides of the light guide plate 110. It can be seen that the first surface 113 and the second surface 114 are respectively the bottom surface and the top surface of the light guide plate 110 in FIG. 1A and FIG. 1B. The light exit surface 112 extends away from the light incident surface 111 and is elongated. A light-emitting element 121 is disposed on the circuit board 120. The light-emitting element 121 is configured to emit light toward the light incident surface 111. The first reflection layer 130 is disposed corresponding to the first surface 113 to cover the first surface 113 and configured to reflect light exiting the light guide plate 110 from the first surface 113 back into the light guide plate 110. The second reflection layer 140 is disposed corresponding to the second surface 114 to cover the second surface 114 and configured to reflect light exiting the light guide plate 110 from the second surface 114 back into the light guide plate 110.

As can be seen from the foregoing structural configurations, the first surface 113 of the light guide plate 110 actually corresponds to the light exit surface (i.e., the front surface) of a traditional light guide plate, and the light exit surface 112 of the light guide plate 110 of the present disclosure actually corresponds to a side surface of the traditional light guide plate. Different from the front light emitting method of the traditional light guide plate, the size of the light exit surface 112 of the light guide plate 110 of the present embodiment is the thickness of the light guide plate 110, so the light-emitting module 100 of the present embodiment can make the light exit surface 112 have a slender visual effect.

In some embodiments, at least one of the first reflection layer 130 and the second reflection layer 140 may be a reflective sheet, but the present disclosure is not limited in this regard. In some other embodiments, at least one of the first reflection layer 130 and the second reflection layer 140 may be a diffusion sheet coated with white paint, and the white paint faces the light guide plate 110. In some other embodiments, at least one of the first reflection layer 130 and the second reflection layer 140 may be white ink.

As shown in FIGS. 1A and 1B, in the present embodiment, the light-emitting module 100 further includes a light-shielding structure 161. A projection of the light-shielding structure 161 in a direction perpendicular to the light exit surface 112 covers a part of the light exit surface 112 and a gap G between the light-emitting element 121 and the light incident surface 111. The aforementioned part of the light exit surface 112 is simultaneously connected to the light incident surface 111, the first surface 113, and the second surface 114. In this way, the light that has just entered the light guide plate 110 from the light incident surface 111 and has not been mixed evenly can be prevented from immediately exiting from the light exit surface 112.

In some embodiments, as shown in FIG. 1B, the light-shielding structure may be a portion extending from the second reflection layer 140.

Figure 2A:
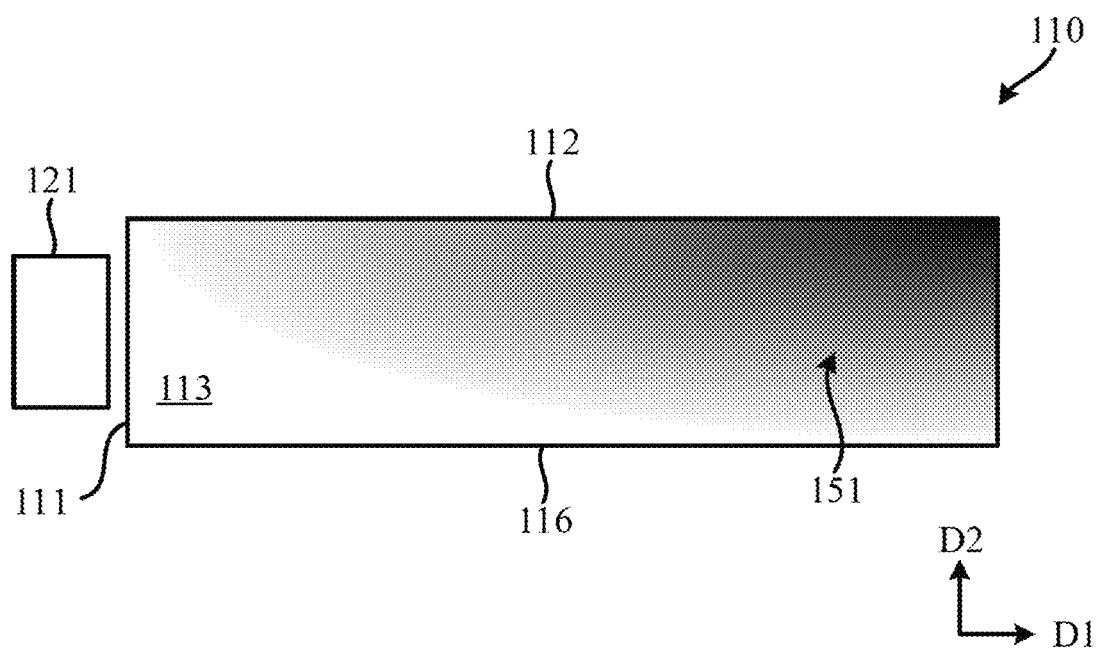
FIG. 2A is a bottom view of some components of the light-emitting module in FIG. 1A according to an embodiment of the disclosure.
Figure 2B:
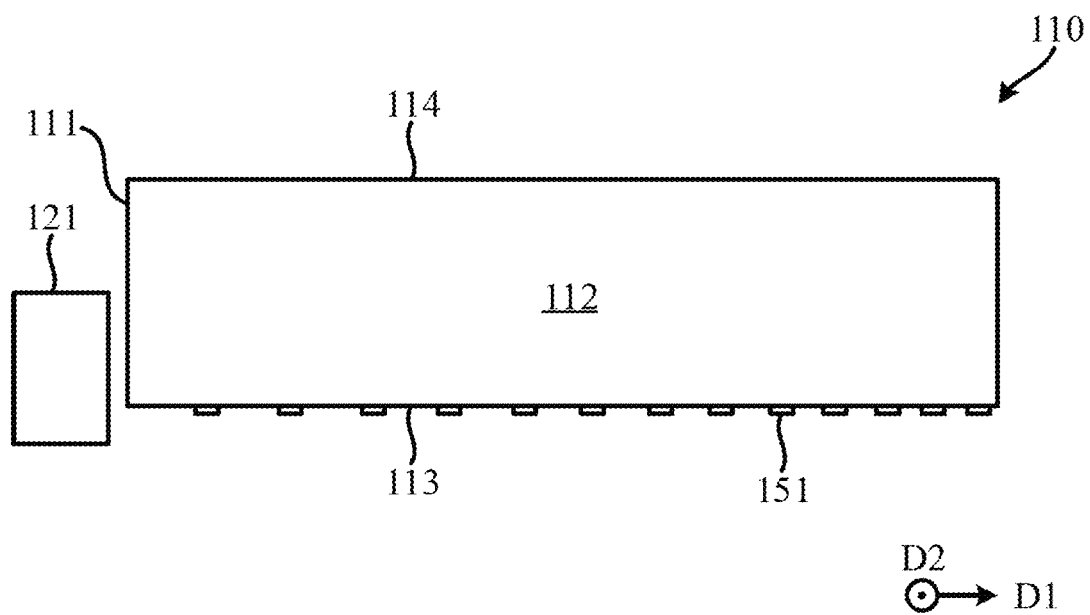
FIG. 2B is a side view of the components in FIG. 2A.

Reference is made to FIGS. 2A and 2B. FIG. 2A is a bottom view of some components of the light-emitting module 100 in FIG. 1A according to an embodiment of the disclosure. FIG. 2B is a side view of the components in FIG. 2A. As shown in FIGS. 2A and 2B, in the present embodiment, the light-emitting module 100 further includes a plurality of optical disturbance structures 151. The optical disturbance structures 151 are disposed on the first surface 113 of the light guide plate 110. A density of the optical disturbance structures 151 gradually increases in a direction D1 away from the light incident surface 111 and in a direction D2 toward the light exit surface 112. The optical disturbance structures 151 are used to destroy the total internal reflection of the light traveling in the light guide plate 110, so as to control the transmission of the light traveling in the light guide plate 110. When the density of the optical disturbance structures 151 is large, the light disturbance is more intense, and the light is diffused/scattered more. On the contrary, when the density of the optical disturbance structures 151 is small, the light disturbance is slight, and the light is diffused/scattered less. By making the density of the optical disturbance structures 151 gradually increase in the direction D1 away from the light incident surface 111, the transmission distance and uniformity of light after entering the light guide plate 110 from the light incident surface 111 can be effectively extended and improved. By making the density of the optical disturbance structures 151 gradually increase in the direction D2 toward the light exit surface 112, the light-extracting efficiency can be effectively improved, and the brightness of the light exit surface 112 can be increased.

In some embodiments, the direction D1 is perpendicular to the light incident surface 111 of the light guide plate 110, but the present disclosure is not limited in this regard. In some embodiments, the direction D2 is perpendicular to the light exit surface 112 of the light guide plate 110, but the disclosure is not limited in this regard.

In some embodiments, as shown in FIG. 2B, the optical disturbance structures 151 are, for example, circular dots or linear lines formed on the light guide plate 110 by printing, but the present disclosure is not limited in this regard. In some other embodiments, the optical disturbance structures 151 may be structures formed by the light guide plate 110 itself being concave or convex and having the aforementioned pattern of dots or lines.

Figure 3A:
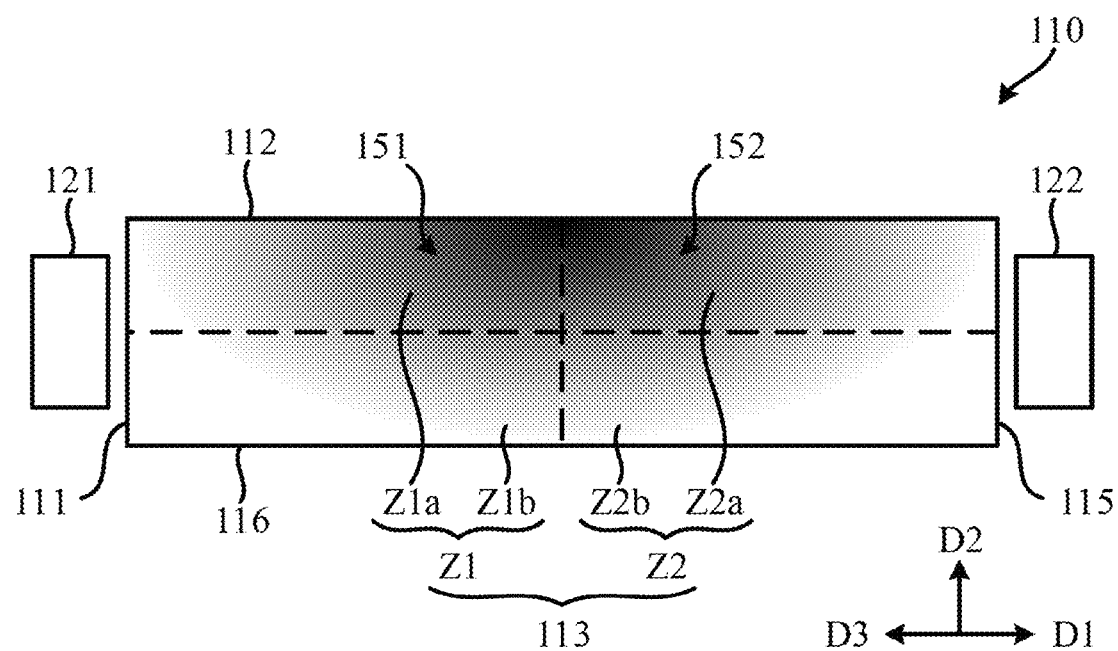
FIG. 3A is a bottom view of some components of a light-emitting module according to another embodiment of the disclosure.
Figure 3B:
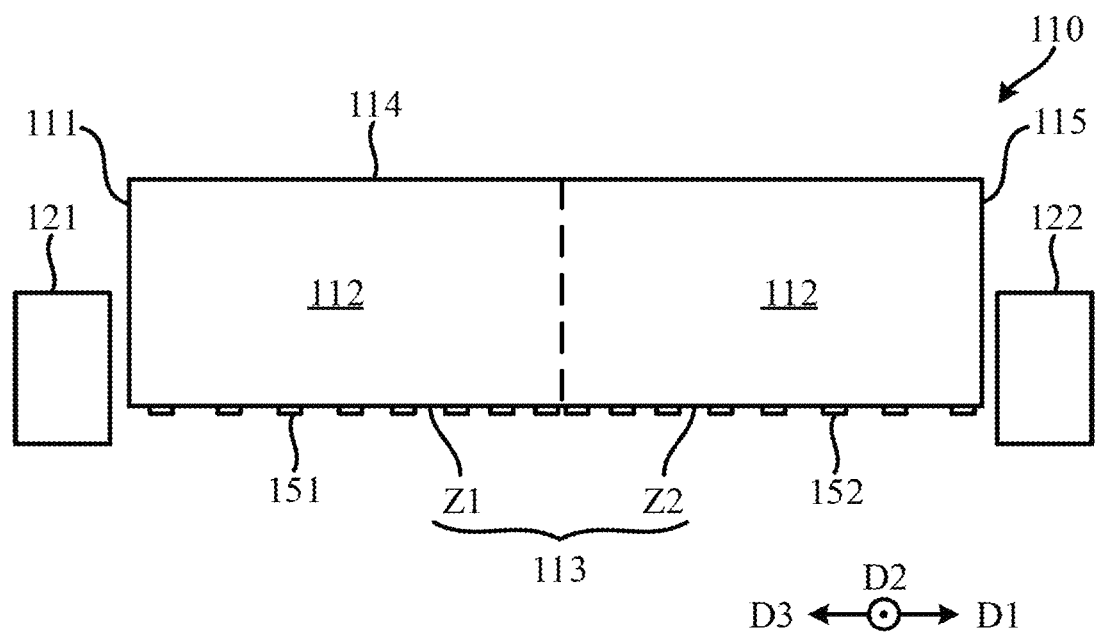
FIG. 3B is a side view of the components in FIG. 3A.

Reference is made to FIGS. 3A and 3B. FIG. 3A is a bottom view of some components of a light-emitting module 100 according to another embodiment of the disclosure.

FIG. 3B is a side view of the components in FIG. 3A. As shown in FIGS. 3A and 3B, in the present embodiment, the light guide plate 110 has another light incident surface 115 (i.e., a second light incident surface). The light incident surfaces 111, 115 are respectively located on opposite two sides of the light guide plate 110, and can be regarded as a first end surface and a second end surface of the light guide plate 110 respectively. The light-emitting module 100 further includes another light-emitting element 122 (i.e., a second light-emitting element) disposed on the circuit board 120. The light-emitting element 122 is configured to emit light toward the light incident surface 115. It should be noted that although the circuit board 120 is not shown in FIG. 3A and FIG. 3B, in fact, the light guide plate 110 in the present embodiment is disposed over the circuit board 120 and located between the light-emitting elements 121, 122.

Compared with the embodiment shown in FIGS. 2A and 2B, the first surface 113 of the light guide plate 110 of the present embodiment includes a first zone Z1 and a second zone Z2. The first zone Z1 is simultaneously connected to the light incident surface 111, the light exit surface 112, and the back surface 116, and is separated from the light incident surface 115 by the second zone Z2. The optical disturbance structures 151 are disposed in the first zone Z1. The density of the optical disturbance structures 151 disposed in the first zone Z1 gradually increases in the direction D1 away from the light incident surface 111 and in the direction D2 toward the light exit surface 112. The second zone Z2 is connected between the first zone Z1 and the light incident surface 115. Specifically, the second zone Z2 is simultaneously connected to the light incident surface 115, the light exit surface 112, and the back surface 116, and is separated from the light incident surface 111 by the first zone Z1. Optical disturbance structures 152 (i.e., second optical disturbance structures) are disposed in the second zone Z2. The density of the optical disturbance structures 152 disposed in the second zone Z2 gradually increases in a direction D3 away from the light incident surface 115 and in the direction D2 toward the light exit surface 112.

In detail, the optical disturbance structures 151, 152 can be regarded as an optical disturbance portion of the light guide plate 110. The first surface 113 has a first light guide zone Z1a, a second light guide zone Z2a, a third light guide zone Z1b, and a fourth light guide zone Z2b. The first light guide zone Z1a and the second light guide zone Z2a are adjacent to the light exit surface 112 of the light guide plate 110 (which can be regarded as a first side surface of the light guide plate 110). The third light guide zone Z1b and the fourth light guide zone Z2b are adjacent to the back surface 116 of the light guide plate 110 (which can be regarded as a second side surface of the light guide plate 110). The first zone Z1 is composed of the first light guide zone Z1a and the third light guide zone Z1b. The second zone Z2 is composed of the second light guide zone Z2a and the fourth light guide zone Z2b. A total area of the optical disturbance portion in the first light guide zone Z1a and a total area of the optical disturbance portion in the second light guide zone Z2a are substantially equal. A total area of the optical disturbance portion in the third light guide zone Z1b and a total area of the optical disturbance portion in the fourth light guide zone Z2b are substantially equal. The total area of the optical disturbance portion in the first light guide zone Z1a is greater than the total area of the optical disturbance portion in the third light guide zone Z1b.

On the other hand, a number of the optical disturbance structures 151 in the first light guide zone Z1a and a number of the optical disturbance structures 152 in the second light guide zone Z2a are substantially equal. A number of the optical disturbance structures 151 in the third light guide zone Z1b and a number of the optical disturbance structures 152 in the fourth light guide zone Z2b are substantially equal. The number of the optical disturbance structures 151 in the first light guide zone Z1a is greater than the number of the optical disturbance structures 151 in the third light guide zone Z1b.

In some embodiments, when squarely viewing the first surface 113 (such as the viewing angle of FIG. 3A), areas of any two of the optical disturbance structures 151, 152 are substantially equal.

In practical applications, the first surface 113 may be disposed with the optical disturbance structures 151 only, and the optical disturbance structures 152 are instead disposed on the second surface 114. Moreover, the densities of the optical disturbance structures 151, 152 are changed in the same manner as in the embodiment shown in FIGS. 3A and 3B, which will not be repeated here.

Figure 4A:
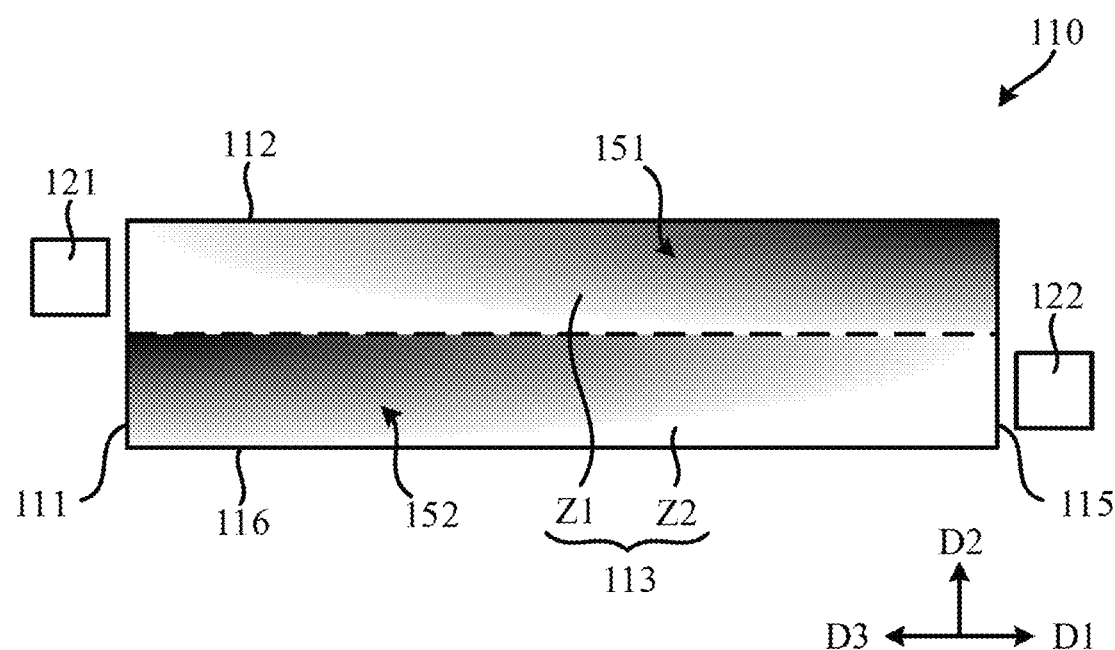
FIG. 4A is a bottom view of some components of a light-emitting module according to another embodiment of the disclosure.
Figure 4B:
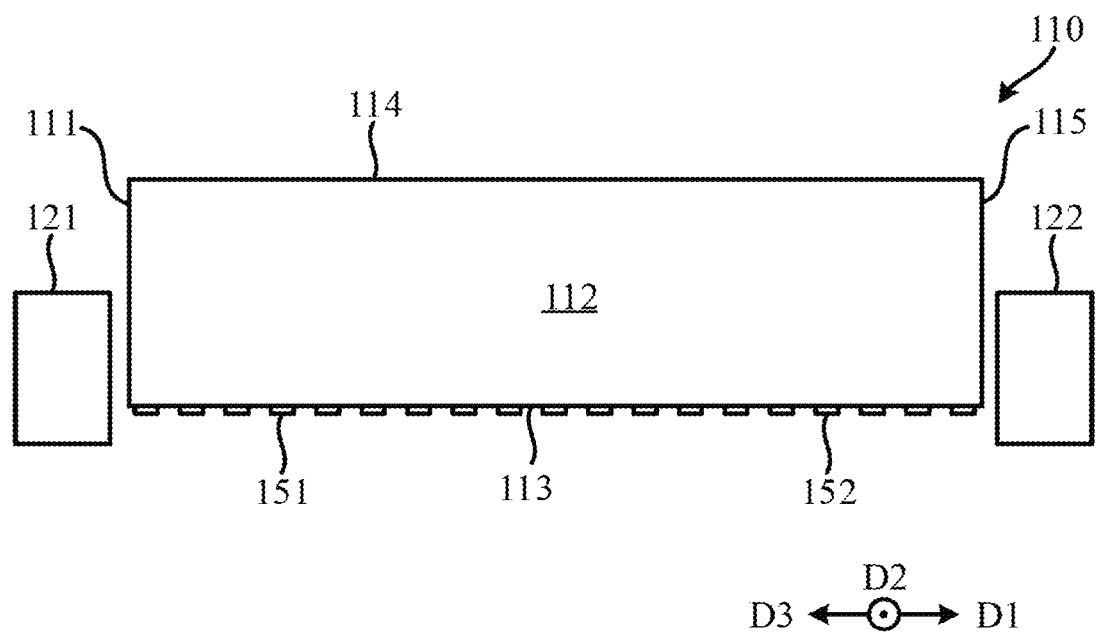
FIG. 4B is a side view of the components in FIG. 4A.

Reference is made to FIGS. 4A and 4B. FIG. 4A is a bottom view of some components of a light-emitting module 100 according to another embodiment of the disclosure. FIG. 4B is a side view of the components in FIG. 4A. Compared with the embodiments shown in FIGS. 3A and 3B, the first surface 113 of the light guide plate 110 of the present embodiment includes a first zone Z1 and a second zone Z2. The first zone Z1 is simultaneously connected to the light incident surfaces 111, 115 and the light exit surface 112, and is separated from the back surface 116 by the second zone Z2. The optical disturbance structures 151 are disposed in the first zone Z1. The density of the optical disturbance structures 151 disposed in the first zone Z1 gradually increases in the direction D1 away from the light incident surface 111 and in the direction D2 toward the light exit surface 112. The second zone Z2 is connected between the first zone Z1 and the back surface 116. Specifically, the second zone Z2 is simultaneously connected to the light incident surfaces 111, 115 and the back surface 116, and is separated from the light exit surface 112 through the first zone Z1. The optical disturbance structures 152 are disposed in the second zone Z2. The density of the optical disturbance structures 152 disposed in the second zone Z2 gradually increases in the direction D3 away from the light incident surface 115 and in the direction D2 toward the light exit surface 112.

In practical applications, the optical disturbance structures 152, 152 are instead disposed on the second surface 114, and the densities of the optical disturbance structures 151, 152 are changed in the same manner as in the embodiment shown in FIGS. 3A and 3B, which will not be repeated here.

Figure 5A:
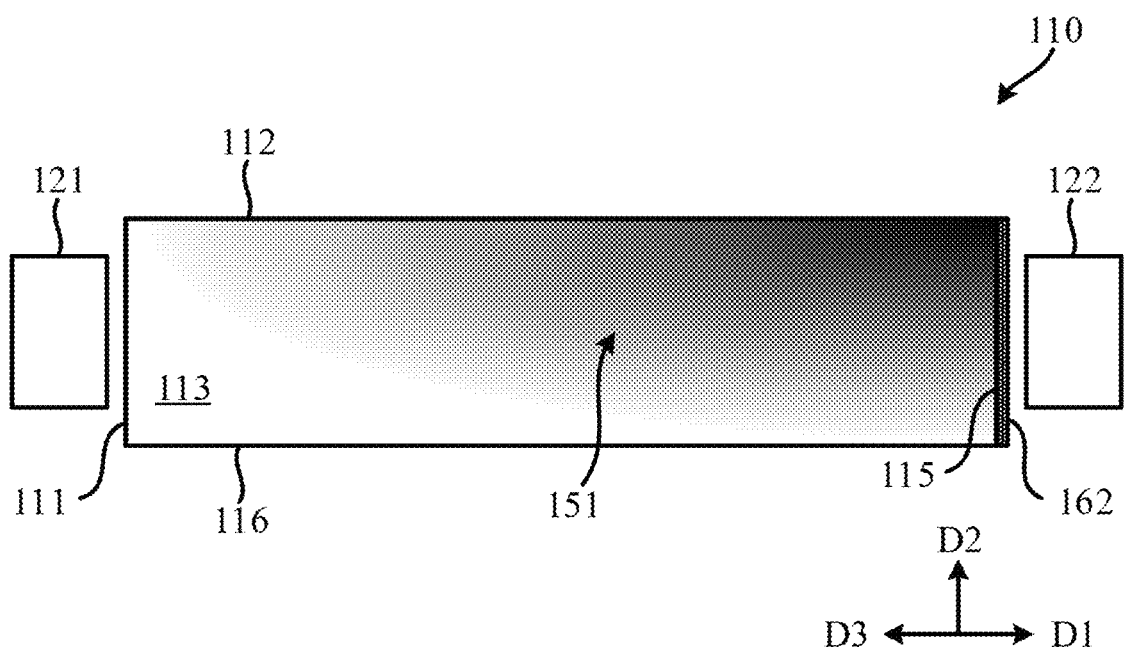
FIG. 5A is a bottom view of some components of a light-emitting module according to another embodiment of the disclosure.
Figure 5B:
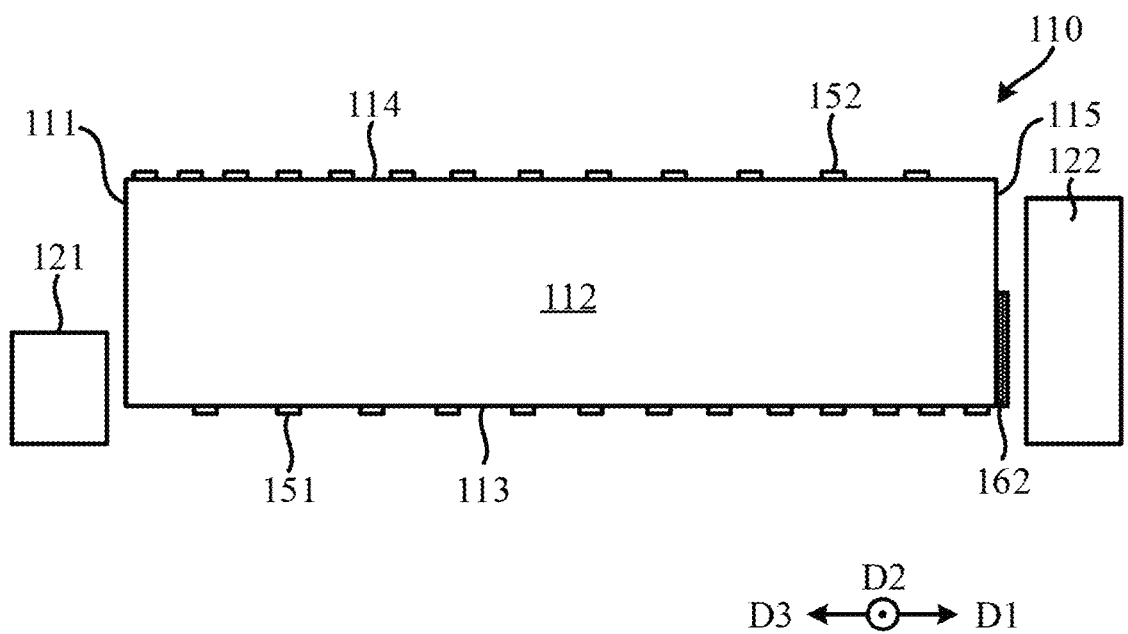
FIG. 5B is a side view of the components in FIG. 5A.

Reference is made to FIGS. 5A and 5B. FIG. 5A is a bottom view of some components of a light-emitting module 100 according to another embodiment of the disclosure. FIG. 5B is a side view of the components in FIG. 5A. As shown in FIGS. 5A and 5B, in the present embodiment, the density of the optical disturbance structures 151 disposed on the first surface 113 gradually increases in the direction D1 away from the light incident surface 111 and in the direction D2 toward the light exit surface 112. The optical disturbance structures 152 are disposed on the second surface 114. The density of the optical disturbance structures 152 disposed on the second surface 114 gradually increases in the direction D3 away from the light incident surface 115 and in the direction D2 toward the light exit surface 112. A height of the light-emitting element 122 relative to the first surface 113 is greater than a height of the light-emitting element 121 relative to the first surface 113. The light-emitting module 100 further includes a light-shielding structure 162 covering the light incident surface 115. A height of the light-emitting element 122 relative to the first surface 113 is greater than a height of the light-shielding structure 162 relative to the first surface 113. In this way, the light emitted by the light-emitting element 121 enters the light guide plate 110 at a height closer to the first surface 113 and is mainly diffused/scattered by the optical disturbance structures 151 on the first surface 113. In contrast, the light emitted by the light-emitting element 122 enters the light guide plate 110 at a height closer to the second surface 114 and is mainly diffused/scattered by the optical disturbance structures 152 on the second surface 114.

Figure 6:
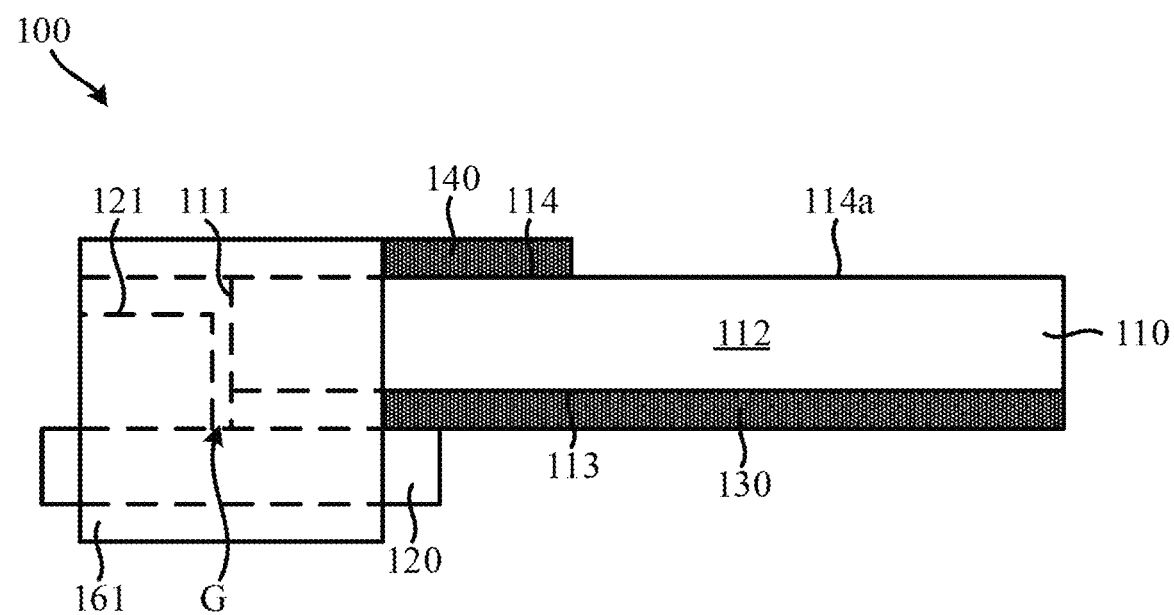
FIG. 6 is a side view of a light-emitting module according to another embodiment of the disclosure.

Reference is made to FIG. 6. FIG. 6 is a side view of a light-emitting module 100 according to another embodiment of the disclosure. As shown in FIG. 6, in the present embodiment, the light-emitting module 100 includes a light guide plate 110, a circuit board 120, a light-emitting element 121, a first reflection layer 130, a second reflection layer 140, and a light-shielding structure 161. The difference between the present embodiment and the embodiment shown in FIG. 1A lies in that the second surface 114 of the light guide plate 110 of the present embodiment has a light exit zone 114a. The light exit zone 114a is a zone on the second surface 114 not being covered by the second reflection layer 140. In other words, the second reflection layer 140 of the present embodiment does not completely cover the second surface 114 of the light guide plate 110. Therefore, the light transmitted in the light guide plate 110 can be emitted from the light exit zone 114a of the second surface 114 in addition to the light exit surface 112.

According to the foregoing recitations of the embodiments of the disclosure, it can be seen that in the light-emitting module of the present disclosure, the light exit surface of the light guide plate extends away from the light incident surface and is elongated, and the light exit surface is connected between the first surface and the second surface respectively located on opposite sides of the light guide plate. The first reflection layer disposed on the first surface is configured to reflect light exiting the light guide plate from the first surface back into the light guide plate. The second reflection layer disposed on the second surface is configured to reflect light exiting the light guide plate from the second surface back into the light guide plate. It can be seen that the first surface or the second surface of the light guide plate of the present disclosure actually corresponds to the light exit surface of a traditional light guide plate, and the light exit surface of the light guide plate of the present disclosure actually corresponds to a side surface of the traditional light guide plate. Different from the front light emitting method of the traditional light guide plate, the size of the light exit surface of the light guide plate of the present disclosure is the thickness of the light guide plate, so the light-emitting module of the present disclosure can provide the visual effect of a slender light exit surface.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A light-emitting module, comprising:
   a light guide plate having a light incident surface, a light exit surface, a first surface, and a second surface, the light incident surface having three edges connected sequentially, the first surface, the light exit surface, and the second surface being connected to the edges respectively, the first surface and the second surface being respectively located on opposite sides of the light guide plate, wherein the light exit surface extends away from the light incident surface and is elongated;
   a light-emitting element configured to emit light toward the light incident surface;
   a first reflection layer disposed corresponding to the first surface to cover the first surface and configured to reflect light exiting the light guide plate from the first surface back into the light guide plate; and
   a second reflection layer disposed corresponding to the second surface to cover the second surface and configured to reflect light exiting the light guide plate from the second surface back into the light guide plate.

2. The light-emitting module of claim 1, further comprising a plurality of optical disturbance structures disposed on the first surface, wherein a density of the optical disturbance structures gradually increases in a direction away from the light incident surface and in a direction toward the light exit surface.

3. The light-emitting module of claim 2, wherein the light guide plate has a second light incident surface, the second light incident surface and the light incident surface are respectively located on opposite two sides of the light guide plate, and the light-emitting module further comprises:
   a second light-emitting element configured to emit light toward the second light incident surface.

4. The light-emitting module of claim 3, further comprising a plurality of second optical disturbance structures disposed on one of the first surface and the second surface, wherein a density of the second optical disturbance structures gradually increases in a direction away from the second light incident surface and in the direction toward the light exit surface.

5. The light-emitting module of claim 4, wherein the first surface comprises:
   a first zone connected to the light incident surface, wherein the optical disturbance structures are disposed in the first zone; and
   a second zone connected between the first zone and the second light incident surface, wherein the second optical disturbance structures are disposed in the second zone.

6. The light-emitting module of claim 4, wherein the light guide plate further has a back surface, the light exit surface and the back surface are respectively located on opposite two sides of the light guide plate, and the first surface comprises:
   a first zone connected to the light exit surface, wherein the optical disturbance structures are disposed in the first zone; and
   a second zone connected between the first zone and the back surface, wherein the second optical disturbance structures are disposed in the second zone.

7. The light-emitting module of claim 4, wherein the second optical disturbance structures are disposed on the second surface.

8. The light-emitting module of claim 7, wherein a height of the second light-emitting element relative to the first surface is greater than a height of the light-emitting element relative to the first surface.

9. The light-emitting module of claim 8, further comprising a light-shielding structure covering the second light incident surface, wherein a height of the second light-emitting element relative to the first surface is greater than a height of the light-shielding structure relative to the first surface.

10. The light-emitting module of claim 1, further comprising a light-shielding structure, a projection of the light-shielding structure in a direction perpendicular to the light exit surface covering a part of the light exit surface and a gap between the light-emitting element and the light incident surface, wherein the part of the light exit surface is simultaneously connected to the light incident surface, the first surface, and the second surface.

11. The light-emitting module of claim 10, wherein the light-shielding structure is a portion extending from the second reflection layer.

12. The light-emitting module of claim 1, wherein the second surface has a light exit zone, and the light exit zone is a zone on the second surface not being covered by the second reflection layer.

13. A light-emitting module, comprising:
a circuit board on which a first light-emitting element and a second light-emitting element are disposed;
a light guide plate disposed over the circuit board and located between the first light-emitting element and the second light-emitting element, the light guide plate having a first end surface, a second end surface, a top surface, and a bottom surface, wherein the first end surface is adjacent to the first light-emitting element, and the second end surface is adjacent to the second light-emitting element;
an optical disturbance portion disposed on one of the top surface and the bottom surface;
a first reflection layer disposed on the bottom surface of the light guide plate and configured to reflect light exiting the light guide plate back into the light guide plate; and
a second reflection layer disposed on the top surface of the light guide plate and configured to reflect light exiting the light guide plate back into the light guide plate,
wherein light emitted by the first light-emitting element enters the light guide plate through the first end surface, and light emitted by the second light-emitting element enters the light guide plate through the second end surface,
wherein a first side surface and a second side surface are respectively located on opposite two sides of the light guide plate, and the top surface and the bottom surface are respectively located on opposite two sides of the light guide plate.

14. The light-emitting module of claim 13, wherein the one of the top surface and the bottom surface has a first light guide zone, a second light guide zone, a third light guide zone, and a fourth light guide zone, the first light guide zone and the second light guide zone are connected to the first side surface, the third light guide zone and the fourth light guide zone are connected to the second side surface, wherein a total area of the optical disturbance portion in the first light guide zone and a total area of the optical disturbance portion in the second light guide zone are substantially equal, a total area of the optical disturbance portion in the third light guide zone and a total area of the optical disturbance portion in the fourth light guide zone are substantially equal, and the total area of the optical disturbance portion in the first light guide zone is greater than the total area of the optical disturbance portion in the third light guide zone.

15. The light-emitting module of claim 13, wherein the optical disturbance portion comprises a plurality of optical disturbance structures, the one of the top surface and the bottom surface has a first light guide zone, a second light guide zone, a third light guide zone, and a fourth light guide zone, the first light guide zone and the second light guide zone are connected to the first side surface, the third light guide zone and the fourth light guide zone are connected to the second side surface, wherein a number of the optical disturbance structures in the first light guide zone and a number of the optical disturbance structures in the second light guide zone are substantially equal, a number of the optical disturbance structures in the third light guide zone and a number of the optical disturbance structures in the fourth light guide zone are substantially equal, and the number of the optical disturbance structures in the first light guide zone is greater than the number of the optical disturbance structures in the third light guide zone.

16. The light-emitting module of claim 15, wherein when squarely viewing the one of the top surface and the bottom surface, areas of any two of the optical disturbance structures are substantially equal.

* * * * *